United States Patent
Breitenfeld et al.

(10) Patent No.: US 10,977,855 B1
(45) Date of Patent: Apr. 13, 2021

(54) SYSTEMS AND METHODS FOR PROCESSING VOLUMETRIC DATA USING A MODULAR NETWORK ARCHITECTURE

(71) Applicant: Verizon Patent and Licensing Inc., Arlington, VA (US)

(72) Inventors: Denny Breitenfeld, Florham Park, NJ (US); Vidhya Seran, Irving, TX (US); Nazneen Khan, Alpharetta, GA (US); Richard J. Kern, II, Dickson City, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/587,285

(22) Filed: Sep. 30, 2019

(51) Int. Cl.
*G06T 15/08* (2011.01)
*G06T 17/20* (2006.01)
*G06T 15/00* (2011.01)

(52) U.S. Cl.
CPC ............ *G06T 15/08* (2013.01); *G06T 15/005* (2013.01); *G06T 17/20* (2013.01); *G06T 2210/56* (2013.01)

(58) Field of Classification Search
None
See application file for complete search history.

(56) References Cited

U.S. PATENT DOCUMENTS

| | | | | |
|---|---|---|---|---|
| 2014/0172377 | A1* | 6/2014 | Taubin | G06T 17/00 703/1 |
| 2015/0371110 | A1* | 12/2015 | Hwang | G06T 17/005 382/201 |
| 2016/0150217 | A1* | 5/2016 | Popov | H04N 13/239 348/48 |
| 2020/0143554 | A1* | 5/2020 | Toldo | G06T 7/593 |

* cited by examiner

Primary Examiner — Vu Nguyen

(57) ABSTRACT

An exemplary volumetric processing system includes a set of point cloud generators, a point cloud organizer, a voxelizer, and a set of patch renderers. The point cloud generators correspond to image capture systems disposed at different vantage points to capture color and depth data for an object located within a capture area. The point cloud generators generate respective point clouds for the different vantage points based on the captured surface data. The point cloud organizer consolidates point cloud data that corresponds to a surface of the object. The voxelizer generates a voxel grid representative of the object based on the consolidated point cloud data. The set of patch renderers generates, based on the voxel grid, a set of rendered patches each depicting at least a part of the surface of the object. Corresponding systems and methods are also disclosed.

19 Claims, 11 Drawing Sheets

SYSTEMS AND METHODS FOR PROCESSING VOLUMETRIC DATA USING A MODULAR NETWORK ARCHITECTURE

BACKGROUND INFORMATION

Extended reality technologies (e.g., virtual reality technology, augmented reality technology, mixed reality technology, etc.) allow users to experience extended reality worlds in a variety of entertainment, educational, vocational, and other enjoyable and/or valuable types of applications. In certain examples, extended reality worlds may be implemented as partially or fully simulated realities based on real world places and objects that would be difficult, inconvenient, expensive, or otherwise challenging for users to experience in a non-simulated manner. In at least some of these examples, real world places and objects may be captured and represented in real time so as to allow the places and objects to be experienced live as events in the real world are ongoing.

While much value may be derived from extended reality experiences based on real-world scenes, many challenges may be associated with capturing and generating such extended reality media content. For example, there remains room for improvement in architecting data structures capable of performing the immense computational tasks of generating and providing content representative of large real-world scenes with large numbers of objects, and performing such tasks in ways that are efficient and scalable.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
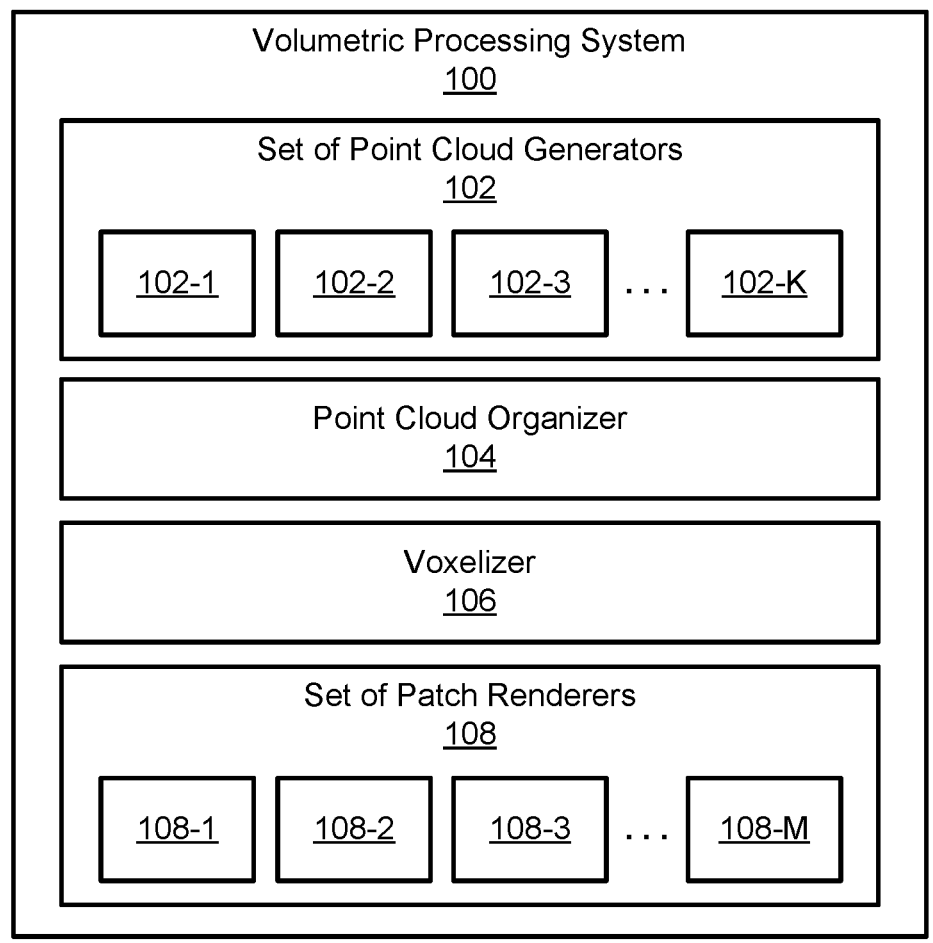
FIG. 1 illustrates an exemplary volumetric processing system for processing volumetric data using a modular network architecture according to embodiments described herein.

Systems and methods for processing volumetric data using a modular network architecture are described herein. Various processing tasks are performed to capture data representative of a real-world capture area and to convert that data into a three-dimensional ("3D") volumetric model that can be presented in real time to a user to allow the user to experience an extended reality world that is based on the real-world capture area. Conventionally, such processing tasks have been performed by particular hardware in a manner that is suitable for relatively small capture areas. However, conventional architectures for processing volumetric data are difficult to scale and thus may not operate effectively or efficiently for processing data representative of large capture areas. Accordingly, the modular network architectures disclosed as part of the systems and methods described herein may allow volumetric data to be captured and processed in a manner that is scalable, efficient, and effective for capture areas of any size and for any desired quality of service (e.g., resolution, frame rate, level of detail, etc.). Moreover, the modular network architectures of the systems and methods described herein allow for predefined and/or real-time load balancing between hardware resources.

As one example of a modular network architecture that may provide the benefits described herein, a volumetric processing system (e.g., a modular volumetric processing system) may include a set of point cloud generators (i.e., computing systems configured to perform operations associated with point cloud generation), a point cloud organizer (i.e., a computing system configured to perform operations associated with point cloud organization), a voxelizer (i.e., a computing system configured to perform voxelization operations), and a set of patch renderers associated with the voxelizer (i.e., computing systems configured to perform patch rendering operations). In this example, the set of point cloud generators may each correspond to an image capture system in a set of image capture systems disposed at different vantage points with respect to a capture area (e.g., a real-world capture area). The image capture systems may be configured to capture and provide surface data representative of color and depth characteristics of surface points of an object located within the capture area, and the set of point cloud generators may be configured to generate respective point clouds for each of the different vantage points based on the captured surface data.

The point cloud organizer in this example may be configured to consolidate point cloud data that corresponds to a surface of the object. For instance, the point cloud data may be consolidated from one or more of the respective point clouds generated by the set of point cloud generators. The voxelizer may be configured to generate, based on the consolidated point cloud data for the object, a voxel grid representative of the object, and the set of patch renderers associated with the voxelizer may be configured to generate (e.g., based on the voxel grid) a set of rendered patches each depicting at least a part of the surface of the object.

Various implementations of such volumetric processing systems will be described herein, including certain implementations that include additional components configured to process additional objects based on the same captured point cloud data. For instance, another exemplary volumetric processing system may include (e.g., among other components as will be further described in more detail below) a set of point cloud generators, a first point cloud organizer, a second point cloud organizer, a first voxelizer, a second voxelizer, a first set of patch renderers associated with the first voxelizer, and a second set of patch renderers associated with the second voxelizer.

In this example, as with the example set forth above, each point cloud generator in the set of point cloud generators may correspond to a different image capture system in a set of image capture systems disposed at different vantage points around a capture area. Again, the image capture systems may be configured to capture and provide surface data representative of color and depth characteristics of surface points of objects within the capture area, including, in this example, a first object and a second object. Additionally, the set of point cloud generators may again be configured to generate respective point clouds for each of the different vantage points based on the captured surface data.

The first point cloud organizer in this exemplary volumetric processing system implementation may be configured to consolidate first point cloud data corresponding to a surface of the first object from a subset of the respective point clouds generated by a subset of the set of point cloud generators. Similarly, the second point cloud organizer in this exemplary volumetric processing system implementation may be configured to consolidate second point cloud data corresponding to a surface of the second object from the same subset of point clouds generated by the same subset of the set of point cloud generators (e.g., which subset may include all or fewer than all of the point cloud generators in the set). In other examples, the first and second point cloud organizers may be configured to consolidate respective first and second point cloud data corresponding to the respective surfaces of the first and second objects from different subsets of point clouds generated by different subsets of the set of point cloud generators.

The first voxelizer may be configured to generate, based on the first point cloud data for the first object, a first voxel grid representative of the first object, while the second voxelizer may be configured to generate, based on the second point cloud data for the second object, a second voxel grid representative of the second object. The first set of patch renderers associated with the first voxelizer may thus be configured to generate (e.g., based on the first voxel grid) a first set of rendered patches each depicting at least a part of the surface of the first object. Similarly, the second set of patch renderers associated with the second voxelizer may be configured to generate (e.g., based on the second voxel grid) a second set of rendered patches each depicting at least a part of the surface of the second object. Various details and examples associated with each of the operations performed by these and other exemplary implementations of the volumetric processing systems described herein will be illustrated and described in more detail below.

Systems and methods described herein for processing volumetric data using a modular network architecture may provide and/or be associated with various benefits and advantages. For example, by processing volumetric data using modularized systems such as the point cloud generators, point cloud organizers, voxelizers, and patch renderers described herein, volumetric data processing may be conveniently performed at any scale for which resources are available.

To illustrate, an exemplary volumetric processing system is considered in which four image capture systems capture surface data for a relatively small capture area. Such a system may conceivably be implemented on a single server or other such processing resource using a conventional architecture. However, as it becomes desirable to increase the size of the capture area and to add additional image capture systems (e.g., four more image capture systems, eight more image capture systems, one hundred more image capture systems, etc.), it will at some point become impossible for any single server or consolidated set of computing resources to perform the necessary processing to capture and model the entire capture area, particularly in real time. Accordingly, conventional architectures, while operating suitably for relatively small capture areas with relatively few image capture systems, may be understood to have a scalability issue because they are not well adapted to incorporate additional image capture systems needed to capture a larger capture area.

Advantageously, however, modular volumetric processing systems described herein are configured to scale easily and efficiently to incorporate any number of image capture systems and any amount of hardware processing resources as may be available for a given implementation. For example, as will be described in more detail below, incorporating any number of additional image capture systems to one of the volumetric processing systems described herein may be straightforwardly accomplished by adding additional point cloud generators (e.g., which may be arbitrarily implemented using the same or different hardware resources as are already being used for point cloud generators that are already incorporated) to the set of point cloud generators of the volumetric processing system. Similarly, as the capture area grows to include more and more objects (or as more detail of objects is desired for certain applications), modular point cloud organizers and corresponding voxelizers and sets of patch renderers may be added to the volumetric processing system without regard for what resources implement these components (e.g., the same or different resources as those already being used in the volumetric processing system).

Moreover, the modular and flexible nature of this architecture not only allows for the scope of the capture to increase and decrease as described above, but also allows for load balancing (e.g., including real-time load balancing and predefined, non-real-time load balancing) to be performed. For example, if certain processing resources (e.g., processors, graphics processing units, network links, etc.) become loaded down so as to exceed performance capabilities of the resources and/or to become a bottleneck to the performance of the overall system, the modular network architectures of modular volumetric processing systems described herein conveniently allow for additional resources to be added and/or for tasks to be shifted to resources with lighter loads. In this manner, the load balancing may facilitate smooth operation of the system within performance parameters associated with each resource regardless of the scope of the extended reality world being generated (e.g., regardless of the size of the capture area, regardless of the number of objects included in the capture area, regardless of the quality of service or level of detail being provided, etc.).

Additionally, the flexible and modular architectures described herein allow for various types of resources to be leveraged as may be available in various applications and use cases. For instance, image capture systems including low- or standard-resolution video capture devices and image capture systems including very high-resolution video capture devices may all be leveraged in a single implementation of a volumetric processing system described herein. As another example, computing resources of relatively small devices (e.g., consumer devices, mobile devices, personal computers, etc.) may be leveraged alongside computing resources of devices and systems with very powerful and plentiful computing resources (e.g., multi-access edge compute ("MEC") servers, cloud servers, and/or other powerful computing systems). As yet another example, communication between systems in the architectures described herein need not be limited to any particular data rate or network bandwidth (as is the case in certain conventional architectures). Rather, different types of network links having different data rates, latencies, and bandwidths and/or other characteristics may all be leveraged in accordance with the modular network architectures described herein.

Yet another benefit of the systems and methods described herein for processing volumetric data using modular network architectures is that, with sufficient computing resources, volumetric data may be processed in real time regardless of the scope (e.g., area size, number of objects, detail of level, etc.) of the processing. As used herein, operations may be performed in "real time" when they are performed immediately and without undue delay or delay that would be perceivable or distracting to a user. In some examples, real-time data processing operations may be performed in relation to data that is highly dynamic and time sensitive (i.e., data that becomes irrelevant after a very short time). As such, real-time operations may perform volumetric data processing on data that is relevant and up-to-date. More specifically, timing parameters (e.g., latency limits, frame rates, etc.) that are desired for a particular implementation may be set and satisfied using the architectures described herein as long as sufficient computing resources are allocated. For example, with sufficient resources, a point cloud generation stage may be performed in accordance with a particular timing parameter (e.g., a 33 millisecond ("ms") time limit in one example), a point cloud organization and voxelization stage may be performed in accordance with the same or a different timing parameter (e.g., another 33 ms time limit in this example), and a rendering stage may be performed in accordance with the same or a different timing parameter (e.g., another 33 ms time limit in this example).

Various embodiments will now be described in more detail with reference to the figures. The disclosed methods and devices may provide one or more of the benefits mentioned above and/or various additional and/or alternative benefits that will be made apparent herein.

FIG. 1 illustrates an exemplary volumetric processing system 100 ("system 100") for processing volumetric data using a modular network architecture. As mentioned above and as will be described in more detail below, system 100 may be implemented by one computing system or device (e.g., a MEC server, etc.) in certain examples, or by any suitable number of disparate computing systems or devices (e.g., servers, devices, etc.) in other examples. In some examples, components of system 100 may be distributed between multiple locations as may serve a particular implementation. As shown, system 100 may include, without limitation, a set of point cloud generators 102 (e.g., including point cloud generators 102-1, 102-2, etc.), a point cloud organizer 104, a voxelizer 106, and a set of patch renderers 108 (e.g., including patch renderers 108-1, 108-2, etc.), all of which may be selectively and communicatively coupled to one another.

Each of the components 102 through 108 of system 100 may include or be implemented by hardware and/or software components (e.g., processors, memories, communication interfaces, instructions stored in memory for execution by the processors, etc.). For example, each of the components may include processing resources and/or storage resources in certain examples, while a shared storage facility used by multiple components of system 100 may be used in other examples. Such a storage facility may store and/or otherwise maintain executable data used by the components of system 100 to perform any of the functionality described herein. For example, the storage facility may store instructions that may be executed by the components of system 100 and/or any other data accessed, managed, used, and/or transmitted by system 100 in a particular implementation. Each of components 102 through 108 within system 100 will now be described in more detail.

The set of point cloud generators 102 may include K point cloud generators 102 (labeled 102-1 through 102-K), where K will be understood to be an integer that also represents the number of image capture systems associated with system 100 (not shown in FIG. 1). Each point cloud generator 102 may thus correspond to a particular image capture system in a set of image capture systems that are disposed at different vantage points with respect to a capture area that is being captured and modeled by system 100. As will be described in more detail below, each of these image capture systems may be configured to capture and provide surface data for an object located within the capture area. That is, each image capture system may be configured to capture data representative of color and depth characteristics of surface points of the object. Based on captured surface data accessed from the set of image capture systems, point cloud generators 102 may each be configured to perform (e.g., execute instructions stored in one or more storage facilities associated with the point cloud generators to perform) various functions associated with generating respective point clouds (i.e., sets of point cloud data) for each of the different vantage points.

Point cloud organizer 104 may access (e.g., load, receive, etc.) one or more of the respective point clouds generated by the set of point cloud generators 102, and may consolidate point cloud data, from the one or more accessed point clouds, that corresponds to a surface of the object. As will be described in more detail below, while the point clouds generated by the set of point cloud generators 102 may represent all the surfaces of all the objects included in the capture area, point cloud organizer 104 may be associated with just one object (i.e., the object) and may thus only need access to point clouds that at least partially represent the surface of that object for which the point cloud organizer is responsible. Other point clouds that do not include surface data representing at least part of the surface of the object (e.g., due to an occluded vantage point of the image capture system associated with those point clouds, due to the vantage point of the image capture system being directed in another direction away from the object, etc.) may not include any data relevant to the point cloud organizer 104, and may thus not be accessed by point cloud organizer 104 (although they may be accessed and used by other point cloud organizers associated with other objects as will be described in more detail below).

Voxelizer 106 may access the consolidated point cloud data for the object generated by point cloud organizer 104 and, based on that consolidated point cloud data, may generate a voxel grid representative of the object. As will be described in more detail below, a voxel grid may include a volumetric 3D model or other representation of the object in its entirety, including all sides of the object that may be captured from all of the relevant vantage points. As such, while each point cloud generated by point cloud generators 102 may only represent a part of the object (i.e., a part visible from a particular vantage point of the image capture system associated with a respective point cloud generator 102), the voxel grid generated by voxelizer 106 may represent the object from all viable angles based on the consolidated point cloud data that is provided by point cloud organizer 104.

The set of patch renderers 108 is shown to include M different patch renderers 108 (i.e., patch renderers 108-1 through 108-M), where M is any suitable integer that represents the number of patches used in a particular implementation to suitably represent the object from various angles and/or with various amounts of detail (e.g., various different picture resolutions, various depth resolutions, etc.). The set of patch renderers 108 may access the voxel grid generated by voxelizer 106 and, based on the voxel grid, may generate a set of rendered patches each depicting at least a part of the surface of the object. The set of patch renderers 108 may be associated with voxelizer 106 in the sense that each of the patches rendered by patch renderers 108 may depict a portion or an entirety of the specific object with which point cloud organizer 104 and voxelizer 106 are associated.

While the implementation of system 100 shown in FIG. 1 is configured to process volumetric data for a single object within a capture area, it will be understood that certain implementations of system 100 may be configured to capture and model a capture area that includes a plurality of objects (e.g., a large plurality of objects such as dozens or hundreds of objects, or more). Such implementations may include additional components beyond those shown in FIG. 1. For example, additional voxelizers and point cloud organizers associated with other objects may each be associated with their own respective sets of patch renderers.

Figure 2:
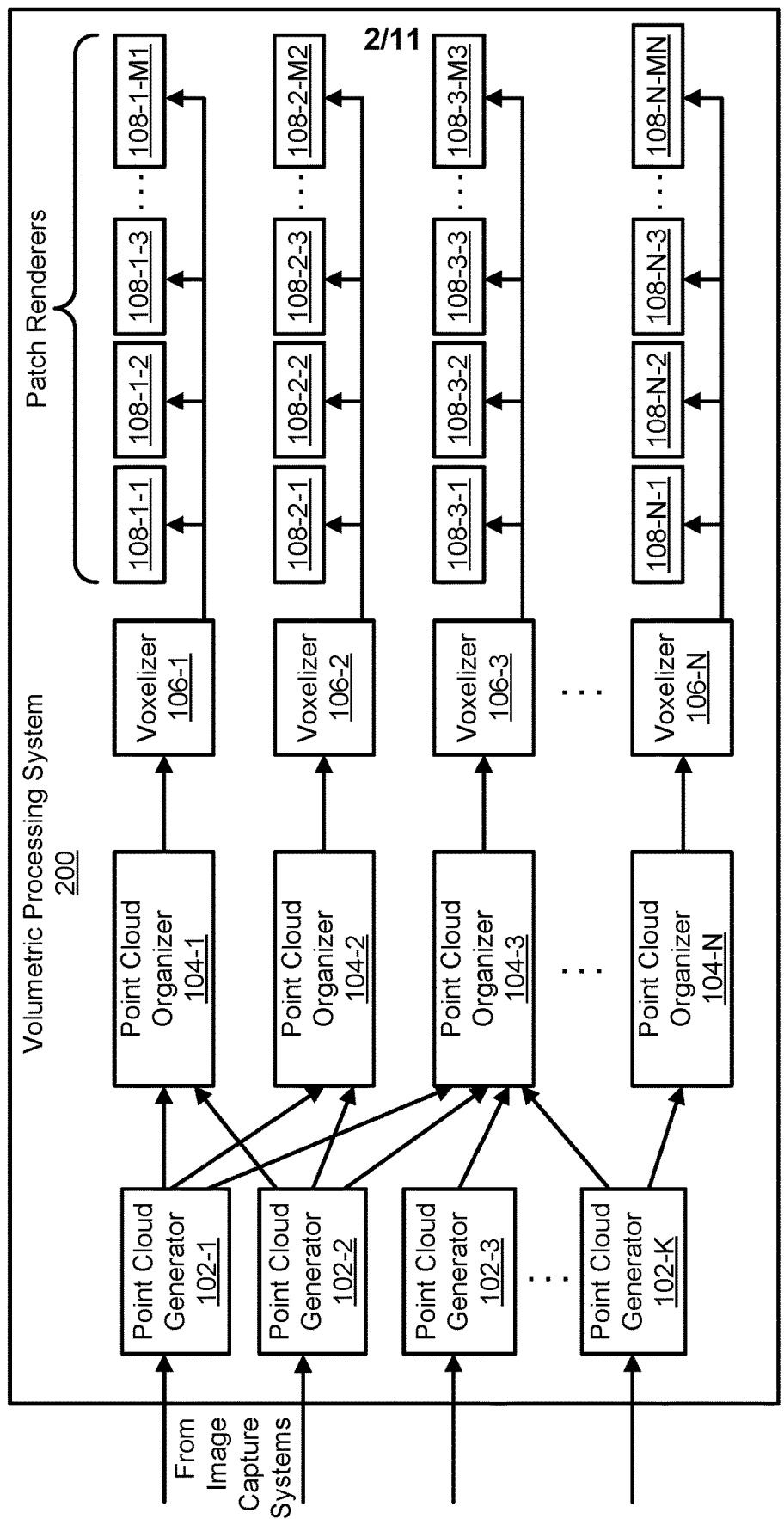
FIG. 2 illustrates an exemplary implementation of the volumetric processing system of FIG. 1 according to embodiments described herein.

To illustrate one such implementation of system 100, FIG. 2 shows an exemplary volumetric processing system 200 ("system 200") that implements and includes similar components as system 100, but that more particularly demonstrates the scalability of the modular network architecture described herein by incorporating a plurality of each type of component so as to be capable of processing volumetric data for a capture area that includes a plurality of different objects (e.g., N different objects, where N is any integer representative of the number of process objects included within the capture area, as will be described in more detail below).

Specifically, as shown in FIG. 2, system 200 includes a set of point cloud generators 102 that may each correspond to a respective image capture system (not shown in FIG. 2) in a set of image capture systems disposed at different vantage points and configured to capture and provide surface data representative of color and depth characteristics of surface points of various objects (e.g., N objects) located within a capture area. As described above with respect to system 100, the set of point cloud generators 102 may be configured to generate respective point clouds for each of the different vantage points based on the captured surface data.

System 200 further includes a plurality of point cloud organizers 104 (e.g., N point cloud organizers 104-1 through 104-N) that are configured to consolidate respective point cloud data (e.g., first point cloud data, second point cloud data, etc., up to Nth point cloud data) that corresponds to respective surfaces of the N objects included in the capture area. For example, as will be described in more detail below, point cloud organizer 104-1 consolidates first point cloud data corresponding to a surface of a first object from a subset of point clouds (i.e., point clouds generated by point cloud generators 102-1 and 102-2), point cloud organizer 104-2 consolidates second point cloud data corresponding to a surface of a second object from the same subset of point clouds, point cloud organizer 104-3 consolidates third point cloud data corresponding to a surface of a third object from a different subset of point clouds (i.e., point clouds generated by point cloud generators 102-1, 102-2, 102-3, and 102-K), and so forth.

System 200 further includes a plurality of voxelizers 106 (e.g., N voxelizers 106-1 through 106-N) that are configured to generate respective voxel grids representative of the respective objects with which the voxelizers 106 are associated. More particularly, each voxelizer 106 corresponds with and receives consolidated point cloud data from a particular point cloud organizer 104, and the point cloud data is representative of all the relevant point cloud data that has been consolidated (e.g., from the relevant subset of point cloud generators 102) for the respective object. For example, voxelizer 106-1 generates a first voxel grid representative of the first object based on the consolidated first point cloud data, voxelizer 106-2 generates a second voxel grid representative of the second object based on the consolidated second point cloud data, voxelizer 106-3 generates a third voxel grid representative of the third object based on the consolidated third point cloud data, and so forth.

Associated with each point cloud organizer 104 and voxelizer 106 pair, system 200 further includes a respective set of patch renderers 108 (e.g., N sets of patch renderers 108 labeled patch renderers 108-1-X through 108-N-X, where X represents an index between 1 and a particular value of M (i.e., M1 through MN) for differentiating the different patch renderers in each respective set of patch renderers). Each set of patch renderers 108 may be configured to generate, based on a respective voxel grid generated by the associated voxelizer 106, a respective set of rendered patches each depicting at least a part of the surface of the respective object. For example, the set of patch renderers 108-1 associated with voxelizer 106-1 may generate M1 rendered patches each depicting at least a part of the surface of the first object based on the first voxel grid, the set of patch renderers 108-2 associated with voxelizer 106-2 may generate M2 rendered patches each depicting at least a part of the surface of the second object based on the second voxel grid, the set of patch renderers 108-3 associated with voxelizer 106-3 may generate M3 rendered patches each depicting at least a part of the surface of the third object based on the third voxel grid, and so forth.

Additional description and detail relating to how each of the system components of systems 100 and 200 operates to process volumetric data using a modular network architecture will now be provided with reference to FIG. 2, as well as to FIGS. 3-8.

As shown by arrows flowing into system 200, data is received by each point cloud generator 102 from a respective image capture system (which may be external to system 200 and are thus not explicitly shown in FIG. 2). Each image capture system may capture, from a respective vantage point with respect to the capture area, surface data such as color data (i.e., how surface points appear in either color or grayscale) and/or depth data (i.e., where surface points are located with respect to a vantage-point-specific or world coordinate system). Additionally, each image capture system may generate additional data (e.g., metadata indicative of the vantage point from which surface data is captured, etc.) to be provided to point cloud generators 102 together with the surface data. While each point cloud generator 102 may be understood to have a dedicated image capture system providing data to, and only to, that particular point cloud generator 102, it will also be understood that a single device (e.g., a single high resolution camera, etc.) may incorporate a plurality of image capture systems in certain examples, and that multiple devices (e.g., multiple lower resolution cameras, etc.) may be combined to form a single image capture system in other examples.

Each image capture system providing surface data and/or other data to point cloud generators 102 may be disposed at a different vantage point with respect to a capture area to thereby allow the image capture systems to collectively capture data about objects within the capture area from angles all around the objects.

Figure 3:
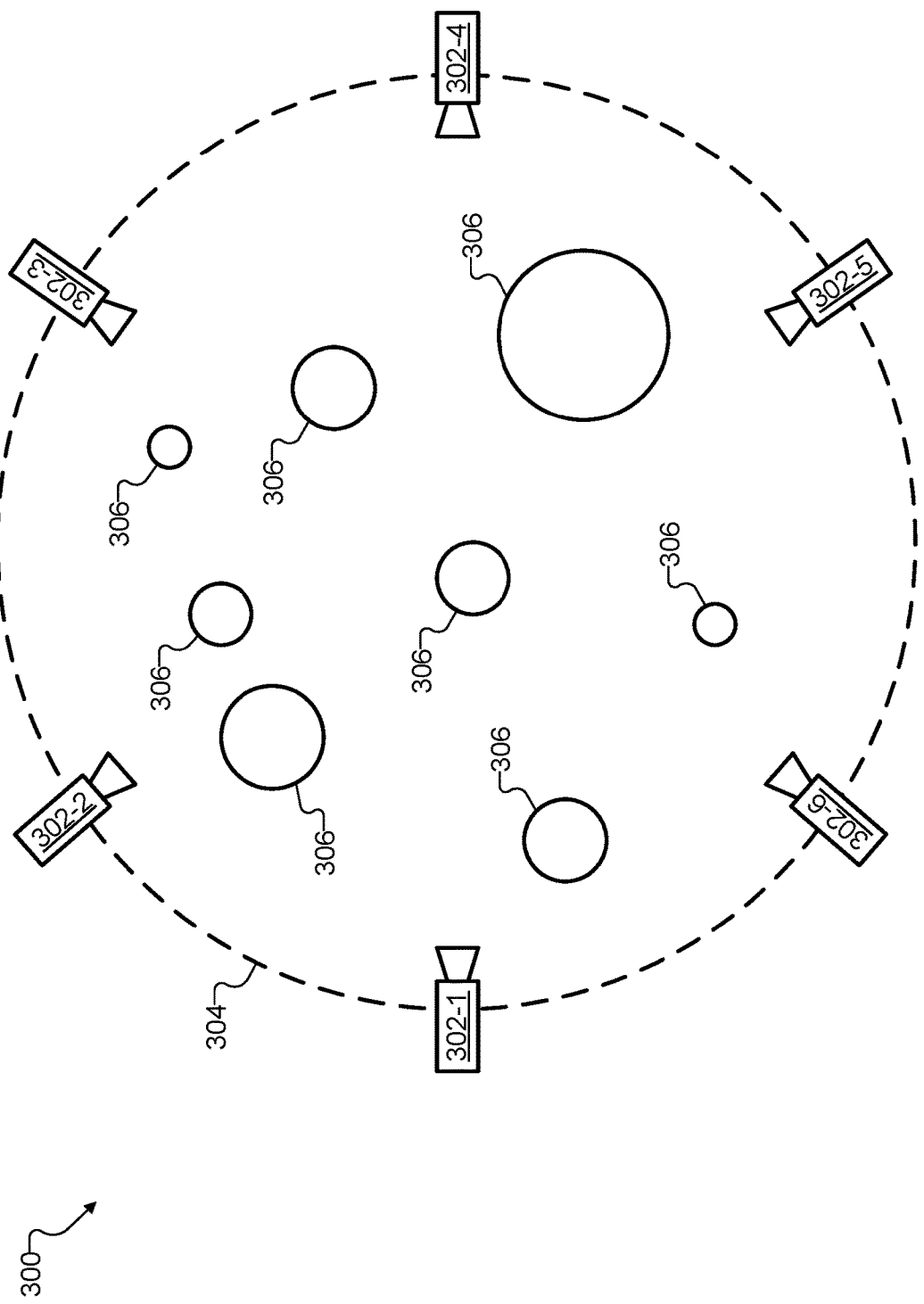
FIG. 3 illustrates an exemplary capture configuration in which an exemplary set of image capture systems is disposed at different vantage points with respect to a capture area according to embodiments described herein.

To illustrate, FIG. 3 shows an exemplary capture configuration 300 in which an exemplary set of image capture systems 302 (e.g., image capture systems 302-1 through 302-6) is disposed at different vantage points with respect to a capture area 304. While each respective vantage point of image capture systems 302 is shown in FIG. 3 to be represented as a different capture location and orientation (i.e., the angle the image capture systems are pointing) with respect to capture area 304, it will be understood that additional aspects besides the capture location and orientation may define a particular vantage point, including, but not limited to, a zoom level of the image capture system, a resolution at which the image capture system captures imagery, intrinsic parameters associated with the image capture system (e.g., how wide angle of a lens is being used), and so forth.

Capture area 304 may represent any real-world area or region that may be captured by a set of image capture systems such as image capture systems 302. For example, capture area 304 may be a relatively small area (e.g., a single room or smaller) or a relatively large area (e.g., a playing field of a professional sports stadium or larger). Capture area 304 may take any shape or form (e.g., the circular shape shown in FIG. 3, a square or rectangular shape, an irregular shape, etc.), including a single continuous area or a collection of unconnected areas. Additionally, capture area 304 may be associated with an event that is ongoing (e.g., a sporting event, a concert, a festival or party, etc.) in any indoor area, outdoor area, or combination area that includes indoor and outdoor regions.

As shown, various objects 306 are included within capture area 304. While, for sake of illustration, objects 306 are depicted as different sized circles, it will be understood that each object 306 may represent any type of animate or inanimate object of any shape or size as may serve a particular implementation. For instance, if capture area 304 includes a football stadium, objects 306 may represent the players on each team, the football, the goal posts, the referees, and so forth. As another example, if capture area 304 includes a stage where a concert is taking place, objects 306 may represent musicians, musical instruments, microphones, and the like. Accordingly, each object 306 will be understood to be any type of real-world object that is visible or detectable in capture area 304 and that is to be represented within extended reality media content that is to be generated as a result of the volumetric data processing.

While objects 306 may thus represent a broad array of different types of objects, it will be understood that the term "object" may also carry a more technical definition in certain usage of the term herein. Specifically, certain components of a modular volumetric processing system (e.g., system 100, system 200, etc.) are said to be associated with an "object" in the sense that these components (e.g., a point cloud organizer 104, a voxelizer 106, a set of patch renderers 108, etc.) are configured to process volumetric data specifically related to that object (and only that object in certain examples). As will be described and illustrated in more detail below, objects 306 may not necessarily map one-to-one with the types of "objects" referred to as being associated with components of a volumetric processing system. Accordingly, the terms "natural object" and "process object" will be used herein to distinguish between these types of objects when necessary. For example, objects 306 may each be understood to represent natural objects that are naturally distinguishable by being distinct from one another, disposed in different spatial locations, and so forth. However, as will be described in more detail below, certain natural objects 306 may incorporate a plurality of process objects that may be processed separately from one another by different point cloud organizers, voxelizers, and sets of patch renderers. As one example that will be described in more detail below, for instance, a natural object 306 implemented as a person within capture area 304 may include three process objects that are processed individually based on the capabilities of the volumetric processing system: one process object for the head of the person, one process object for the torso of the person, and one process object for the legs of the person.

Figure 4:
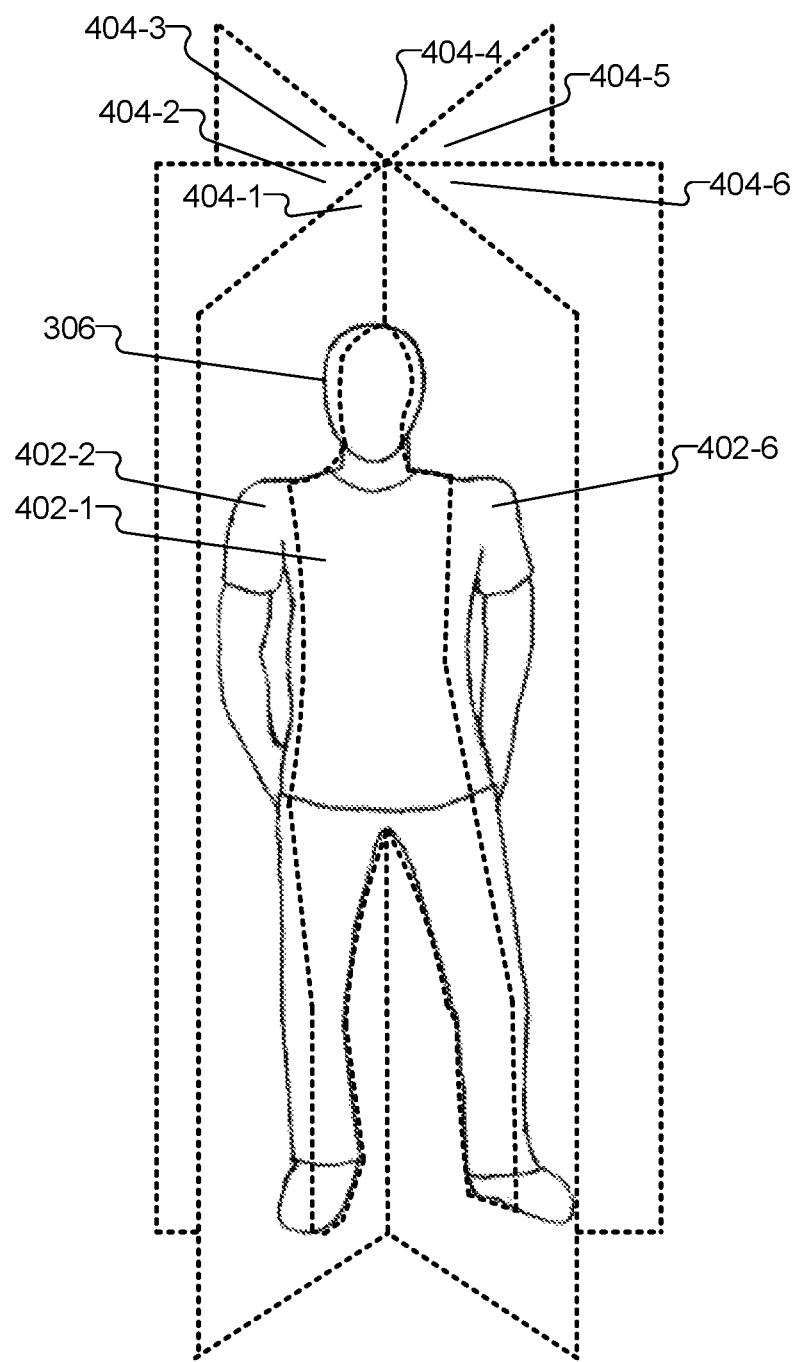
FIG. 4 illustrates exemplary aspects of how surface data representative of an exemplary object is captured from different vantage points according to embodiments described herein.

Image capture systems 302 may capture surface data about each object 306 from all the different vantage points shown in FIG. 3. To illustrate exemplary aspects of how surface data representative of an exemplary object is captured from different vantage points according to embodiments described herein, a particular object 306 will be considered. Specifically, FIG. 4 shows an object 306 that is, in this example, a person present in capture area 304. Accordingly, this particular object 306 will also be referred to as "person 306."

In FIG. 4, person 306 is shown as the surface of person 306 is captured from the vantage points of image capture systems 302 in FIG. 3. As with any 3D object, an external surface of person 306 may be divided into a plurality of regions that correspond to the different vantage points of the image capture systems 302 capturing the surface data representing the surface. For instance, a first region may correspond to a first vantage point because points in the region are closer to the first vantage point than any other vantage point, are more visible from the first vantage point than from any other vantage point, or the like.

Specifically, as shown, a surface 402 of person 306 may be divided in regions 404 (e.g., regions 404-1 through 404-6) according to which parts of surface 402 fall within which region 404. In FIG. 4, each portion of the overall surface 402 of person 306 included in a different region 404 is labeled as surface portion 402-X, where X indicates the region 404 of that portion of the surface. Accordingly, as shown, surface portion 402-1 is a portion of overall surface 402 that is best captured from a vantage point associated with region 404-1 (e.g., the vantage point of image capture system 302-1), surface portion 402-2 is a portion of overall surface 402 that is best captured from a vantage point associated with region 404-2 (e.g., the vantage point of image capture system 302-2), and surface portion 402-6 is a portion of overall surface 402 that is best captured from a vantage point associated with region 404-6 (e.g., the vantage point of image capture system 302-6). Other surface portions 402-3 through 402-5 are not explicitly shown or labeled in FIG. 4, but will be understood to be present on the back side of person 306 that is occluded from the viewpoint associated with FIG. 4.

Returning to FIG. 2, point cloud generators 102 are shown to receive the surface data captured from each respective image capture system 302. For instance, point cloud generator 102-1 may receive surface data and/or other data (e.g., metadata, etc.) captured by image capture system 302-1, point cloud generator 102-2 may receive surface data and/or other data captured by image capture system 302-2, and so forth, in an implementation in which K=6 (i.e., in which there are six image capture systems 302 as shown in FIG. 3 and there are six corresponding point cloud generators 102). As described above, upon receiving the captured surface data and/or other data from a corresponding image capture system 302, each point cloud generator 102 may generate, based on the captured surface data, a respective point cloud for the respective vantage point at which the corresponding image capture system 302 is disposed. For example, point cloud generator 102-1 may generate a point cloud for the vantage point at which image capture system 302-1 is disposed, and so forth.

Figure 5:
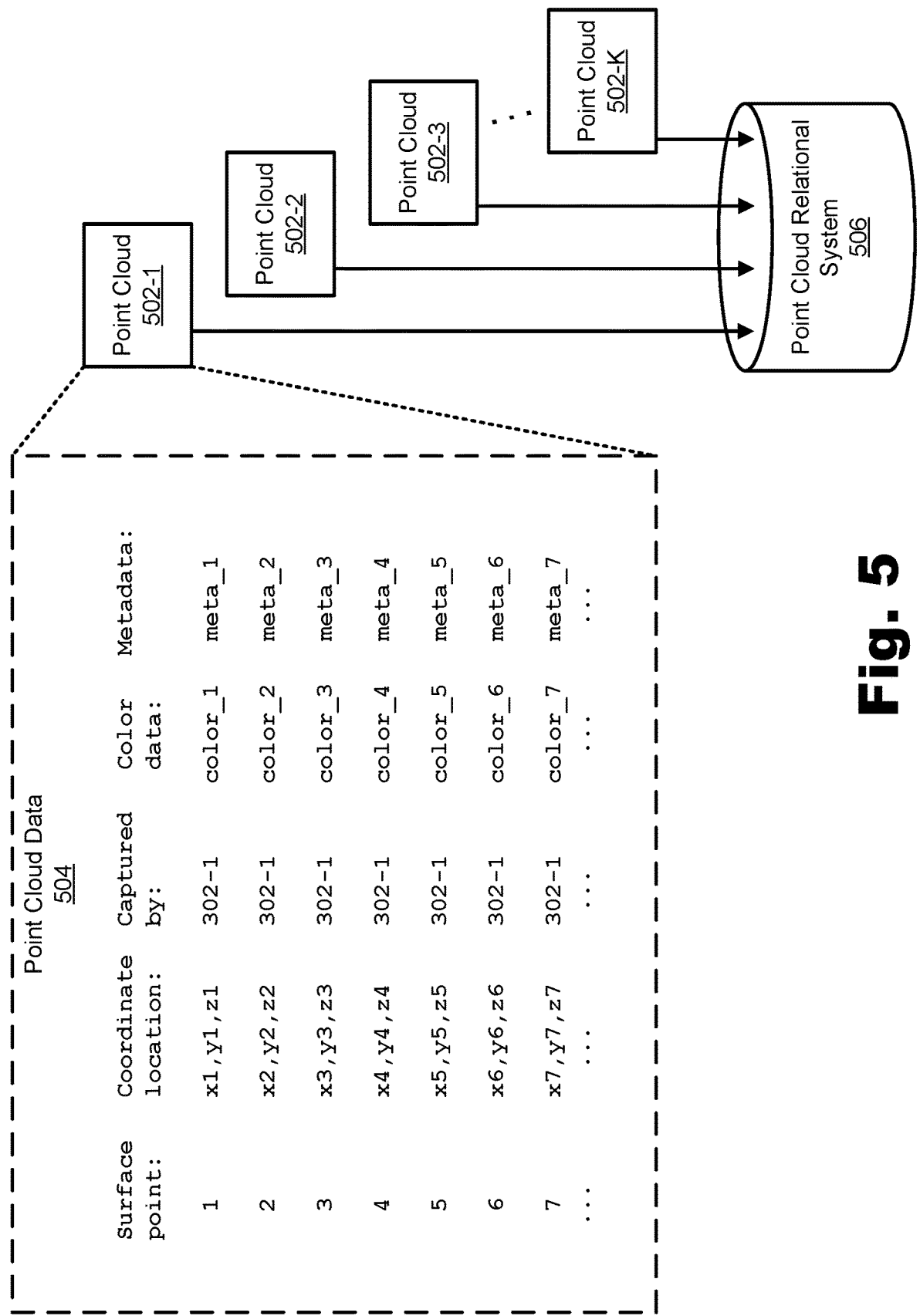
FIG. 5 illustrates exemplary point clouds generated by a set of point cloud generators according to embodiments described herein.

As used herein a "point cloud" may refer to a set of data that defines physical surfaces (e.g., surfaces or portion thereof of one or more objects such as person 306) by representing color data, depth data, and/or other relevant data for each of various surface points. To illustrate, FIG. 5 shows exemplary point clouds 502 (e.g., point clouds 502-1 through 502-K) generated by point cloud generators 102 of system 200. For instance, if K=6, such as in the example described above, six point clouds associated with the six vantage points of image capture systems 302 in capture configuration 300 may be generated by six point cloud generators 102.

To illustrate exemplary data that may be included within a particular point cloud, FIG. 5 shows point cloud data 504 for point cloud 502-1. In point cloud data 504, various column labels listed along the top of the data representation are followed by a series of horizontal rows each representative of a single datapoint in the point cloud and associated with a particular surface point on the surface of the object. More particularly, as indicated by the column labels, each surface point represented in point cloud data 504 (i.e., surface points 1-7 and so on) may be associated with a respective depth characteristic of the surface point (e.g., a "Coordinate location" of the surface point having an x, y, and z component), an indication of which image capture system captured the surface point (i.e., image capture system 302-1 for each of the surface points in point cloud 502-1) and/or an angle or other vantage point details associated with the image capture system, a respective color characteristic of the surface point (e.g., color or texture data indicative of how the surface point appears in color or grayscale), and/or any relevant metadata or other data as may serve a particular implementation.

As the respective point cloud generators 102 generate point cloud data based on surface data received from respective image capture systems 302, one task that may be performed may be to convert or transform depth data represented in each surface data point from a localized coordinate space (e.g., a coordinate space associated only with the image capture system 302 that captured the surface point and/or with the vantage point from which the surface point was captured) to a world coordinate space common to all the surface points represented in all the respective point clouds 502. As such, it will be understood that the depth characteristic of each datapoint in point cloud data 504 may define a three-dimensional position of the particular surface point with respect to the world coordinate system in certain examples, rather than, for instance, with respect to a localized coordinate system. This conversion or transformation may be performed based on extrinsic parameters determined for the image capture systems 302 during a calibration process, or performed in any other suitable way.

As noted above, FIG. 2 shows that each point cloud generator 102 may provide its respective point cloud 502 to one or more point cloud organizers 104. As will be described in more detail below, the point cloud organizers 104 to which a particular point cloud 502 is provided may be determined based on which objects 306 are depicted in the particular point cloud 502, and which process object each particular point cloud organizer 104 is associated with. This determination of which point clouds 502 are to be provided to which point cloud organizers 104 may be performed in any suitable way and by any suitable system. For instance, either or both of point cloud generators 102 and point cloud organizers 104 may be responsible for this point cloud distribution in certain implementations. In the same or other implementations, a dedicated point cloud relational system 506 such as shown in FIG. 5 may be employed to facilitate the point cloud distribution.

For example, system 200 may further include point cloud relational system 506 as a system separate and independent from, but communicatively coupled to, all of the point cloud generators 102 and point cloud organizers 104. As shown in FIG. 5, each point cloud 502 may be provided to point cloud relational system 506 such that point cloud relational system 506 may track point cloud relationships between point cloud data and objects 306 located within capture area 304 so as to dynamically determine which point cloud data generated by point cloud generators 102 is to be used by which point cloud organizers 104. Point cloud relational system 506 may further store and provide access to point cloud relational data indicative of the tracked point cloud relationships between the point cloud data and the objects located within the capture area. For example, point cloud relational system 506 may include or be implemented as a database or other suitable data store into which may be stored point clouds 502, object data indicative of which process objects are associated with which point cloud organizers 104, or other data useful for efficiently and effectively distributing point clouds 502 to point cloud organizers 104 that are to make use of point cloud data in the point clouds 502.

Returning to FIG. 2, each point cloud organizer 104 is associated with one particular process object and may therefore be configured to consolidate point cloud data, from one or more of the respective point clouds 502 generated by the set of point cloud generators 102, that corresponds to a surface of the associated process object. For instance, point cloud organizer 104-1 may be associated in certain examples with a process object such as a head of person 306 and may thus consolidate point cloud data from each point cloud generator 102 whose point cloud relates to the head of person 306 (e.g., point cloud generators 102-1 and 102-2 in the example shown in FIG. 2, point cloud generators 102-1 through 102-6 in the examples shown in FIG. 4, etc.).

In order to operate in this manner, a point cloud organizer 104 may identify the object (e.g., the process object) that it is responsible for prior to consolidating any surface data or even indicating which point clouds the point cloud organizer 104 will need to access. This identification can be accomplished in any manner as may serve a particular implementation. For instance, the point cloud organizer 104 may itself identify the process object by communicating with other point cloud organizers 104 and agreeing on which process object each will be responsible for, how each process object is defined, and so forth. As another example, a separate system such as point cloud relational system 506 may make assignments to each point cloud organizer 104 regarding which process object each will be associated with.

In some examples, the object identified by a particular point cloud organizer 104 may be one of natural objects 306. In other examples, however, it may be the case that a natural object requires more volumetric processing than a single point cloud organizer 104 is capable of performing (at least in real time). Accordingly, as mentioned above and in accordance with the benefits and advantages described above to be provided by flexible and modular network architectures, an object identified for a particular point cloud organizer 104 may be something more or less than one of natural objects 306. For instance, the object identified by a point cloud organizer 104 may be a process object that is incorporated, together with at least one other process object, in a natural object located within the capture area.

Figure 6:
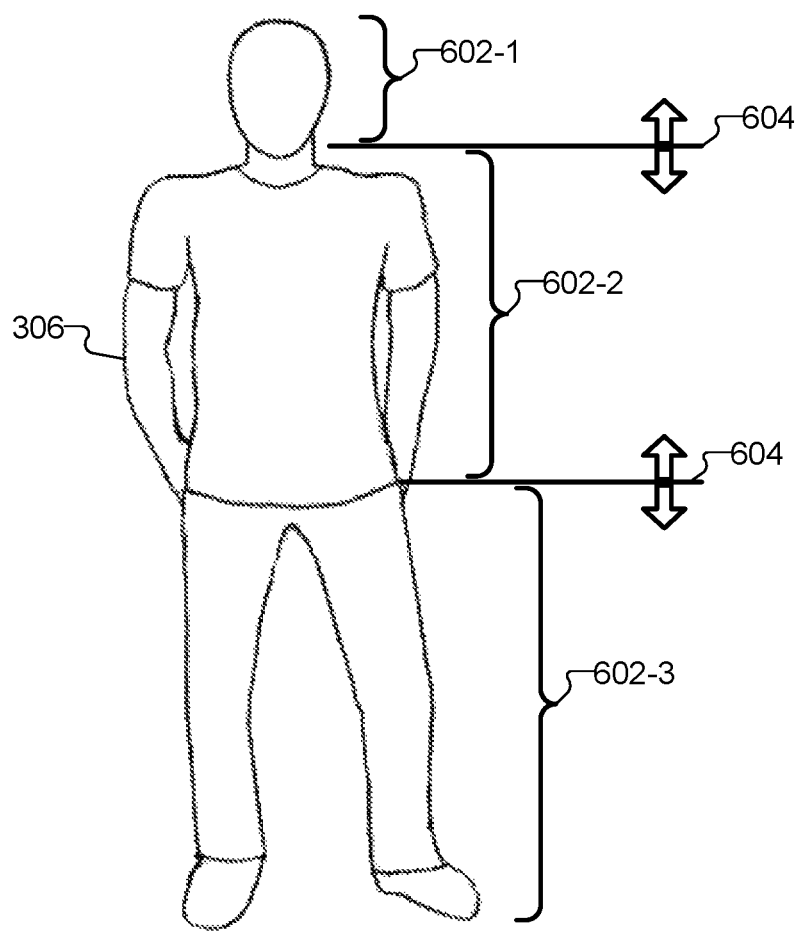
FIG. 6 illustrates exemplary process objects that may be incorporated in the exemplary natural object of FIG. 4 according to embodiments described herein.

To illustrate, FIG. 6 illustrates exemplary process objects 602 (e.g., head object 602-1, torso object 602-2, legs object 602-3) that are incorporated in the natural object of person 306. Person 306 may be divided into a plurality of process objects 602, rather than being processed as a single process object as may be the case for other natural objects, for any reason as may be applicable in a particular implementation. For instance, system 200 or a component thereof (e.g., point cloud organizers 104, point cloud relational system 506, or another component thereof) may determine that there is more detail included in person 306 than can be suitably processed by a single point cloud organizer 104, voxelizer 106, and set of patch renderers 108 in a particular implementation. This may be due to how powerful the available computing resources are, how high a quality of service the implementation aims to provide, or other reasons. Regardless, if more depth or color resolution is desired than can be processed by a single point cloud organizer 104, voxelizer 106, and/or set of patch renderers 108, it may be desirable to split a natural object 306 into a plurality of process objects such as process objects 602. Accordingly, once the natural object is divided in this way, each point cloud organizer 104 may be associated with (e.g., may be assigned to, may take responsibility for, etc.) exactly one process object 602, and person 306 may thus be volumetrically processed by three different point cloud organizers 104 (with their corresponding voxelizers 106 and sets of patch renderers 108).

The identifying of a process object 602 with which a particular point cloud organizer 104 is to be associated may be performed in any suitable manner and based on any suitable criteria. For example, a point cloud organizer 104 may determine a performance capability of the voxelizer 106 and/or the set of patch renderers 108 with which the point cloud organizer 104 is associated, and may identify a process object 602 by defining the object based on this performance capability. If the performance capability is such that the point cloud organizer 104 determines that the entire head of person 306 may be processed, for instance, then head object 602-1 may be defined and identified as the object associated with that point cloud organizer 104. Conversely, if it is determined that the entire head of person 306 is more than the point cloud organizer 104 can process in real time, a suitable sub-portion of the head (e.g., the face, half of the face, a portion of hair, the mouth, etc.) may be defined and identified as the object associated with the point cloud organizer 104. As one relatively simple way of defining process objects 602, boundaries 604 between different process objects incorporated in natural object 306 are shown to be movable and adjustable (illustrated by the arrows on boundaries 604). In this example, process objects 602 may be defined by moving boundaries to make the process objects 602 larger or smaller as appropriate for the computing resources and performance parameters of a particular implementation.

Any suitable factors may be accounted for as performance capabilities are determined and process objects are defined and identified for particular point cloud organizers 104. For instance, processing capabilities, memory and storage performance and space, network and processing bandwidth availability, and network throughput and latency parameters (e.g., including limitations imposed by particular cables used to connect computing systems to one another) of computing resources of system 200 may all be taken into account. Moreover, process objects may also be defined and identified based on the number and layout of rendered patches that will be generated and arranged on an atlas image (described in more detail below).

In other examples, the identification of process objects may be performed with less flexibility but more predictability. For instance, rather than defining process objects by object, process object may be defined spatially. In this type of implementation, for example, the overall volume covered by capture area 304 may be pre-divided into a plurality of individual sub-volumes, and each point cloud organizer 104 and corresponding voxelizer 106 and set of patch renderers 108 may be preassigned to a particular one of the sub-volumes of capture area 304. By spatially assigning modular resources in this way, a high degree of predictability and simplicity may be achieved, although it will be noted that this predictability may come at the cost of efficiency if capture area 304 includes significant empty space since sub-volumes that don't include any object surfaces could result in dedicated resources remaining idle.

In certain implementations, the defining and identification of process objects for each point cloud organizer 104 may be performed as an initialization operation at the beginning of a session, and the associations between process objects and point cloud organizers 104 may remain static throughout the session (e.g., as long as an event within capture area 304 is ongoing, as long as an extended reality world is being generated and provided, etc.).

In other implementations, however, the defining and identification of process for each point cloud organizer 104 may be performed more continuously and/or dynamically during a session. For instance, a point cloud organizer 104 may be configured, during operation of system 200, to dynamically detect a change to the determined performance capability of the voxelizer 106 and/or the set of point cloud generators 108, and to dynamically redefine the identified process object based on the detected change (e.g., by adjusting one of boundaries 604 or the like). As another example, a point cloud organizer 104 may be configured, during operation of system 200, to dynamically detect a change to a previously identified object (e.g., object 306 or one of process objects 602-1), and to similarly dynamically redefine the identified process object based on the detected change.

To provide one specific example, it will be assumed that person 306 is a football player having a head full of hair that is relatively complex and difficult to model (e.g., requiring lots of depth resolution and color resolution to represent realistically). Without a football helmet on, the hair of this person may itself incorporate several process objects, as well as a process object for the player's face, and respective process objects for the torso and legs. However, if this football player puts on a helmet, system 200 may dynamically determine that the entire head may now be handled as a single process object (since the smooth, spherical football helmet may require significantly fewer resources to properly process than the complex hair did). Accordingly, system 200 may be configured to dynamically reallocate resources (e.g., release point cloud organizers 104 that were previously used for the hair to be used for other process objects). Such dynamic redefining of process objects and reallocation of system resources may be performed by point cloud organizers 104, by point cloud relational system 506, or by any other suitable component of system 200 as may serve a particular implementation.

Whether performed statically or dynamically, the defining and identification of process objects may be performed based on predetermined rules or best practices, based on machine learning configured to improve based on performance from previous sessions, or in any other suitable manner.

Returning to FIG. 2, each arrow extending between a point cloud generator 102 and a point cloud organizer 104 represents a point cloud that is being provided from the point cloud generator source to the point cloud organizer destination. Depending on which process object a particular point cloud organizer 104 identifies, the point cloud organizer 104 may request point cloud data from certain point cloud generators. For example, as shown, certain point cloud organizers such as point cloud organizer 104-3 may be associated with a process object that is captured from lots of angles (e.g., torso object 602-2), and may thus receive point clouds from several or all of point cloud generators 102. Accordingly, in this example, the point cloud data corresponding to the surface of torso object 602-2 and consolidated by point cloud organizer 104-3 would be consolidated from a plurality of respective point clouds generated by point cloud generators 102-1, 102-2, 102-3, and 102-N. Moreover, because each of these point clouds captures unique data from a unique vantage point, the respective point clouds may each represent different parts of the surface of torso object 602-2 such that a part of the surface represented by one point cloud is represented only by that point cloud and not by any other point cloud (or by all the other point clouds). As such, various point clouds associated with different vantage points all around the capture area may be required to fully represent an object such as torso object 602-2.

In contrast, as further shown in FIG. 2, certain point cloud organizers such as point cloud organizer 104-N may be associated with a process object that is completely captured from only one vantage point (e.g., a process object that includes only a particular feature of person 306 such as an ear object), and may thus receive point clouds from only a single point cloud generator 102. Accordingly, in this example, all of the point cloud data corresponding to the surface of the ear object and consolidated by point cloud organizer 104-3 would be consolidated from a single point cloud generated by point cloud generator 102-K. As described above, point cloud relational system 506 may be used to make assignments or otherwise facilitate the distribution of appropriate point clouds to appropriate point cloud organizers 104 in any manner as may serve a particular implementation.

Once point cloud organizers 104 have consolidated point cloud data for all of the objects 306 within capture area 304 (i.e., including all of the process objects incorporated in the natural objects 306), the point cloud data consolidated by each point cloud organizer 104 may be provided to a corresponding voxelizer 106 that is associated with a respective set of patch renderers 108. For example, as shown, the consolidated point cloud data generated by point cloud organizer 104-1 may be provided to voxelizer 106-1, which is associated with the set of patch renderers 108-1, the consolidated point cloud data generated by point cloud organizer 104-2 may be provided to voxelizer 106-2, which is associated with the set of patch renderers 108-2, and so forth.

Based on the received consolidated point cloud data for each associated process object, each voxelizer 106 generates a voxel grid (i.e., a volumetric 3D voxelized model or other such representation) of the process object. For instance, if point cloud organizer 104-1 consolidates point cloud data associated with head object 602-1, voxelizer 106-1 generates a voxel grid representative of head object 602-1, and provides the voxel grid (i.e., the data representative of the voxel grid) to each of patch renderers 108-1-1 through 108-1-M1. Based on these voxel grids, each respective set of patch renderers may generate a respective set of rendered patches depicting the surface of the object. For instance, in this example, each patch renderer 108-1 may generate a rendered patch that depicts at least a part of the surface of head object 602-1.

Figure 7:
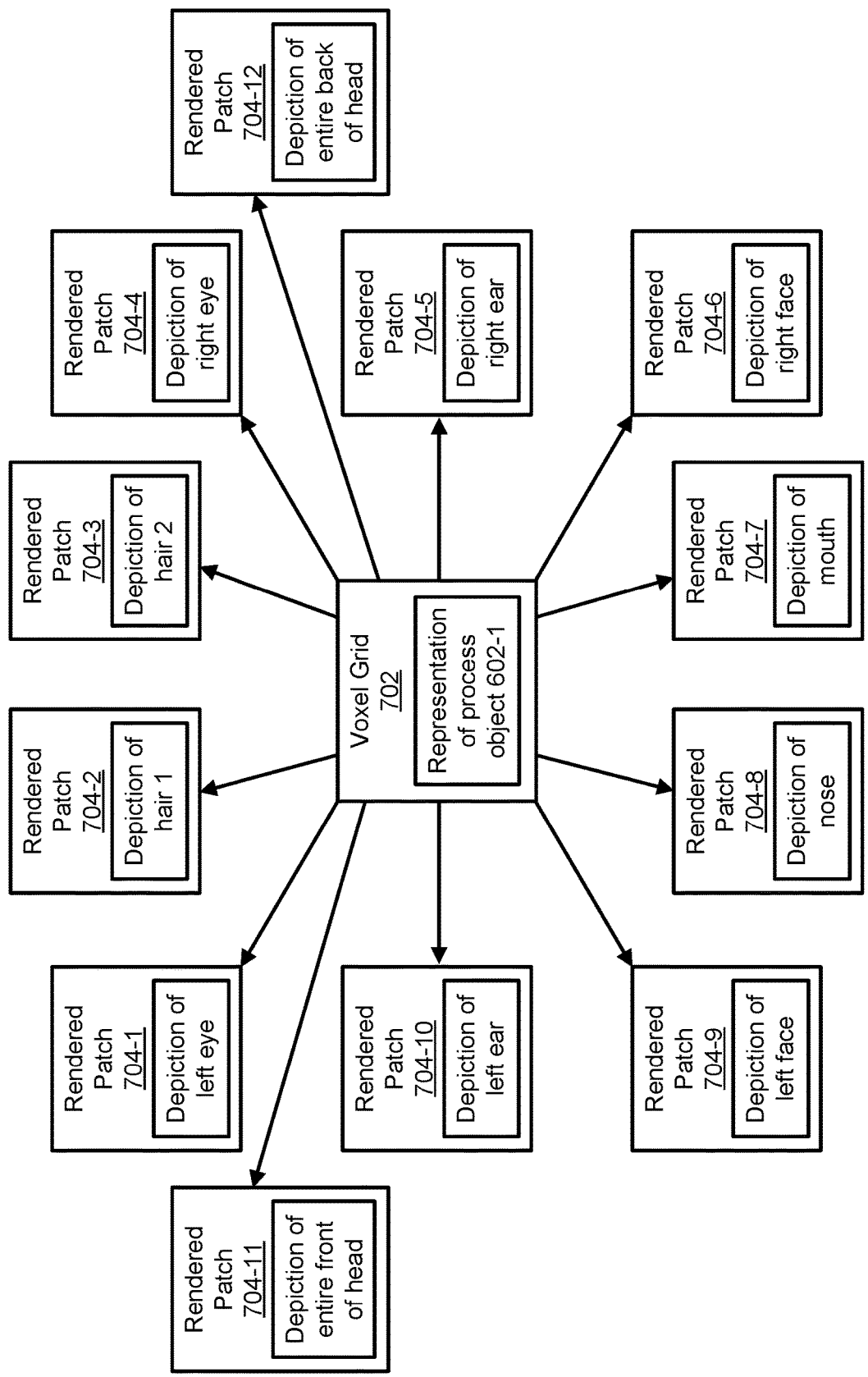
FIG. 7 illustrates an exemplary voxel grid together with an exemplary set of rendered patches generated based on the voxel grid according to embodiments described herein.

To illustrate, FIG. 7 shows an exemplary voxel grid 702 together with an exemplary set of rendered patches 704 (e.g., rendered patches 704-1 through 704-12) generated based on the voxel grid. Specifically, voxel grid 702 is shown in the center of FIG. 7 and will be understood to represent a voxelized 3D representation (e.g. a 3D model, etc.) of head object 602-1. While head object 602-1 is used in this specific example, it will be understood that voxel grid 702 could represent a different process object described above (e.g., one of process objects 602-2 or 602-3, etc.), a full natural object, a process object that includes multiple natural objects, or any other object as may serve a particular implementation. In order for patch renderers 108-1 to respectively generate each of rendered patches 704, a same dataset of the voxel grid representative of head object 602-1 may be provided by voxelizer 106-1 to all the patch renderers 108-1 in the set of patch renderers 108-1, and each patch renderer 108-1 may be assigned to generate, based on this dataset provided by voxelizer 106-1, a different respective rendered patch 704 depicting a different assigned part of the surface of head object 602-1.

Specifically, as shown for this particular example, rendered patch 704-1 may depict the left eye of head object 602-1, rendered patches 704-2 and 704-3 may depict different parts of the hair of head object 602-1 (e.g., the hair on the top of the head and on the sides of the head, respectively), rendered patch 704-4 may depict the right eye of head object 602-1, rendered patch 704-5 may depict the right ear of head object 602-1, rendered patch 704-6 may depict the right side of the face of head object 602-1, rendered patch 704-7 may depict the mouth of head object 602-1, rendered patch 704-8 may depict the nose of head object 602-1, rendered patch 704-9 may depict the left side of the face of head object 602-1, and rendered patch 704-10 may depict the left ear of head object 602-1.

Each rendered patch may include color and depth data depicting and representing the particular feature of the head object indicated. As will be described in more detail below, these rendered patches may be configured to be reconstructed by a media player device as a view of the object is rendered for viewing by a user from an arbitrary vantage point within an extended reality world. It may be advantageous to represent an object such as head object 602-1 with a large number of relatively small patches in order to efficiently represent the head with a high degree of depth resolution. For example, each rendered patch may be generated by using raycasting or raytracing techniques in which virtual light rays are simulated to interact with voxel grid 702 and the resultant appearance of each feature of head object 602-1 is rendered based on the interaction of the virtual light rays. Because certain areas of an object (e.g., a highly textured area such as the hair) may be best represented using a relatively fine depth resolution, relatively small patches may be most efficient in representing these areas. In contrast, other areas of an object (e.g., relatively flat areas such as a cheek) may be suitably represented with less depth resolution, and may thus be efficiently depicted in larger patches. Rendered patches 704 may be generated in any suitable manner and/or from any type of view such as a perspective view or an orthographic view.

While each patch renderer 108-1 is shown in FIG. 7 to depict a respective portion of head object 602-1, it will be understood that the different assigned parts of the surface of head object 602-1 depicted by the different respective rendered patches 704 may collectively comprise an entirety of the surface of head object 602-1. For example, if the depictions of all the rendered patches 704-1 through 704-10 were to be pieced together, a depiction of the entire head object may result.

Additionally, certain rendered patches may also be generated that overlap with (i.e., depict the same surface as) other rendered patches, but at a different level of detail or the like. For instance, because an object like head object 602-1 may potentially be viewed from up close or from further away in the extended reality world, it may be desirable for different versions of the data representing the head (e.g., different versions associated with different levels of detail) to be made available to maximize network and processing efficiencies. Accordingly, along with highly detailed "micro" versions of each feature of the head rendered in rendered patches 704-1 through 704-10, certain patch renderers 108-1 may also be assigned to generate more "macro" versions of the features of the head, such as shown in rendered patch 704-11 (depicting, in a single patch at a lower level of detail, the entire front of the head) and rendered patch 704-12 (depicting, in a single patch at a lower level of detail, the entire back of the head). By providing depictions of the object at varying levels of detail, different versions may be provided to different users who are located at different places within an extended reality world and who thus require different levels of detail for each object in the extended reality world to enjoy an immersive and realistic experience.

The hardware implementing voxelizers 106 and patch renderers 108 may include any suitable computing resources (e.g., graphics processing units, etc.) and may be modularly and flexibly distributed in any manner as may serve a particular implementation.

Once all of rendered patches 704 have been generated, system 200 may provide the patches to downstream systems for further processing by packaging and transmitting the rendered patches in any suitable manner. For example, each set of patch renderers 108 may provide its respective set of rendered patches to a data delivery system communicatively coupled to the set of patch renderers. Such a data delivery system may be incorporated within system 200 or may be an independent system external to system 200. In either case, the data delivery system may be configured to 1) receive each set of rendered patches generated by the sets of patch renderers 108; 2) arrange respective pluralities of rendered patches from the received sets of rendered patches onto respective atlas images; and 3) provide (e.g., by way of a network) the respective atlas images to one or more media player devices each associated with a respective user and each configured to render, for the user, a virtual representation of the capture area based on the rendered patches arranged on the provided atlas image.

Figure 8:
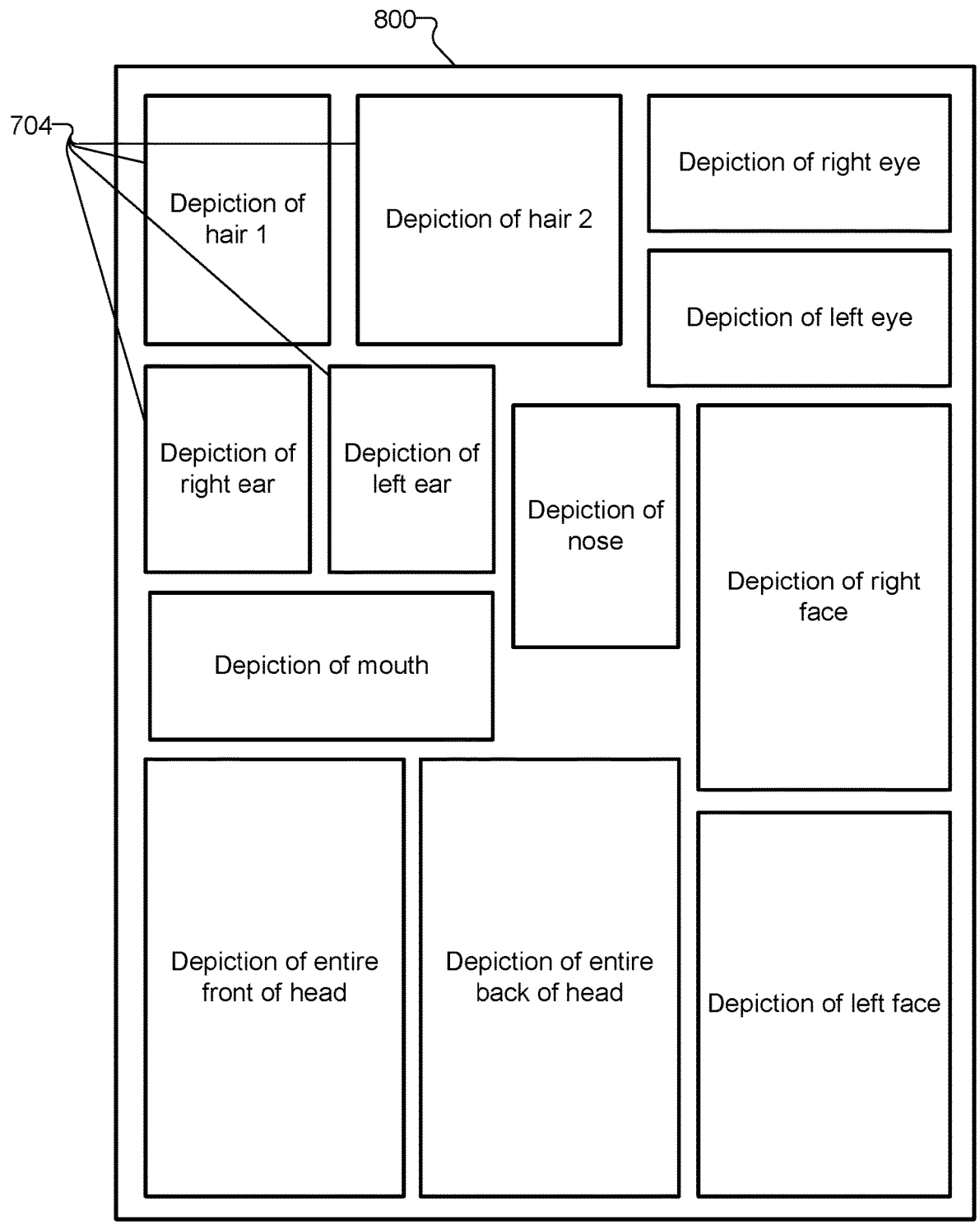
FIG. 8 illustrates an exemplary atlas image on which the set of rendered patches of FIG. 7 is arranged according to embodiments described herein.

To illustrate, FIG. 8 shows an exemplary atlas image 800 on which the set of rendered patches 704 is arranged. Specifically, as shown, atlas image 800 includes each of the depictions of rendered patches 704-1 through 704-12 arranged together on a single image that may be encoded and transferred in accordance with standard image and video encoding and/or distribution protocols. While atlas image 800 shows each of rendered patches 704 generated by the set of patch renderers 108-1, it will be understood that a subset (but not all) of these patches may be arranged together onto an atlas image in certain implementations, and that additional patches not explicitly shown may be packed onto or otherwise arranged on the same atlas image with rendered patches 704 in other implementations. Additionally, as shown, the rendered patches 704 arranged together on atlas image 800 may be different shapes, sizes, aspect ratios, etc., in accordance with the respective features being depicted. As such, the rendered patches 704 may be arranged on atlas image 800 in any manner as may be convenient or efficient (e.g., with regard to spatial real estate on the image).

Atlas image 800 may include rendered patches 704, which depict various features of head object 602-1. Similarly, other atlas images similar to atlas image 800 may be generated from rendered patches depicting respective features of various other process objects included within capture area 304. All of these atlas images may be received and further packaged (e.g., mixed and matched onto new atlas images, encoded, compressed, etc.) by a data delivery system configured to provide extended reality media content to media player devices used by end users to experience an extended reality world corresponding to capture area 304.

Figure 9:
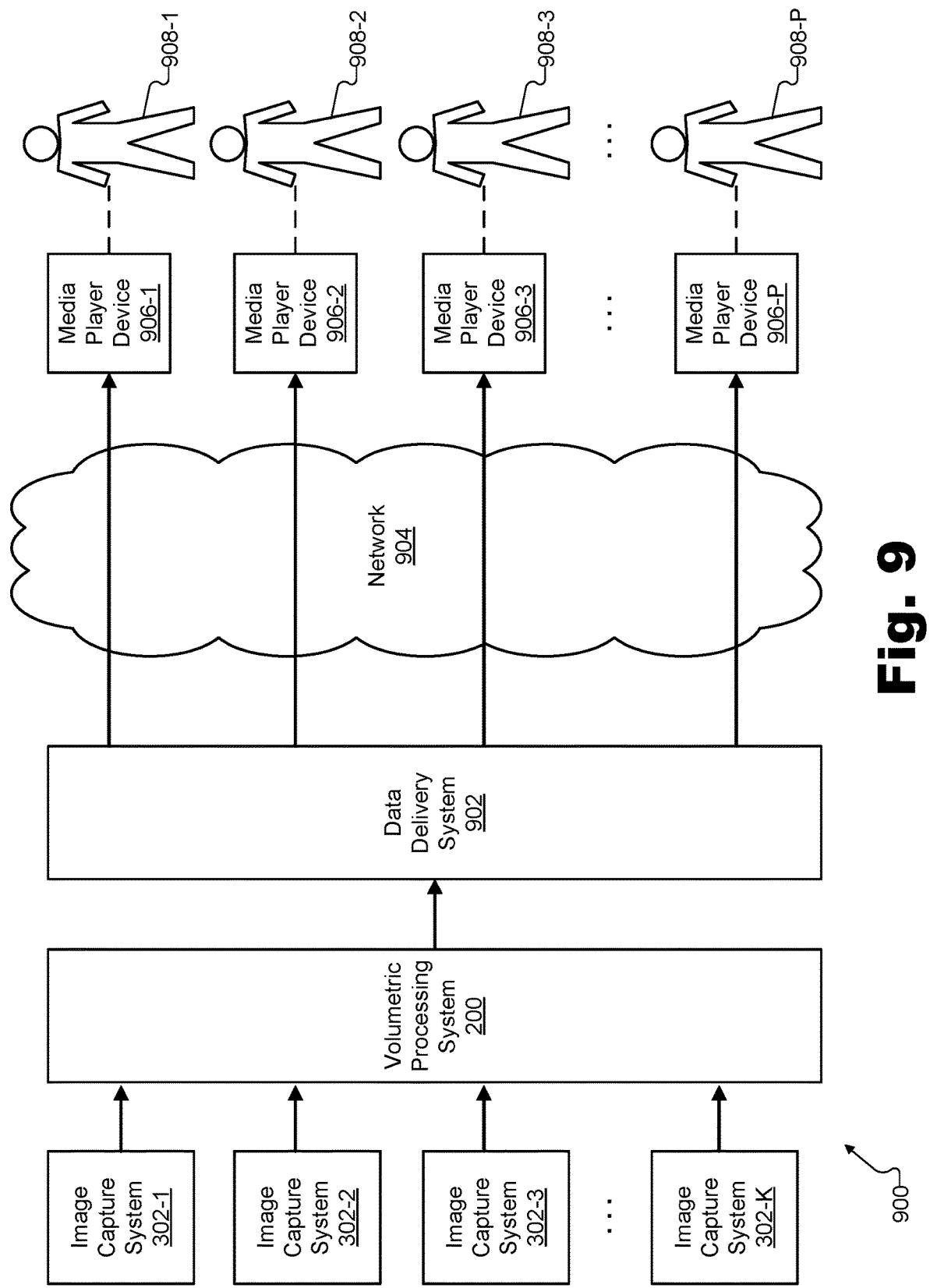
FIG. 9 illustrates an exemplary configuration in which the volumetric processing system of FIG. 2 may operate to process volumetric data using a modular network architecture according to embodiments described herein.

To illustrate, FIG. 9 show an exemplary configuration 900 in which system 200 may operate to process volumetric data using any of the modular network architectures described herein. Specifically, as shown, configuration 900 may include a plurality of image capture systems 302 (e.g., image capture systems 302-1 through 302-K) that all provide respective surface data to system 200. System 200 may then provide data (e.g., atlas images such as atlas image 800 and similar atlas images corresponding to other objects in capture area 304) to a data delivery system 902. After additional data processing and packaging, data delivery system 902 may provide extended reality media content by way of a network 904 to a plurality of media player devices 906 (e.g., media player devices 906-1 through 906-P) being used by a plurality of respective users 908 (e.g., users 908-1 through 908-P). Image capture systems 302 and system 200 have been described in detail above. Each of the remaining elements of configuration 900 will now be described in more detail.

Data delivery system 902 may implement the data delivery system described above, and, as such, may include any suitable computing resources configured to receive and process rendered patches (e.g., arranged together on atlas images such as atlas image 800) to prepare and provide the rendered patches to media player devices 906 together with any other data (e.g., metadata, etc.) as may be useful to allow media player devices 906 to render the extended reality world based on the rendered patches. To this end, data delivery system 902 may include encoding resources configured to convert sequences of atlas images to video images in standard encoded formats that may be convenient for transferring (e.g., streaming) over network 904 and for processing and/or rendering by media player devices 906.

In some examples, data delivery system 902 may arrange the rendered patches for multiple objects (e.g., from atlas image 800 and multiple other such atlas images) onto a single large atlas image that is provided to a particular media player device 906. For example, if user 908-1 indicates that he or she wishes to experience a particular part of the extended reality world that is near certain objects 306 and is further away from other objects 306, data delivery system 902 may prepare extended reality media data that takes the form of a large atlas image including patches depicting all the objects 306 relatively nearby the user at a high level of detail (e.g., patches such as rendered patches 702-1 through 702-10), and all the objects 306 relatively far from the user at a lower level of detail (e.g., patches such as rendered patches 702-11 and 702-12). In this way, different extended reality media content customized to the location of each user within the extended reality world may be provided to each different media player device 906 so as to efficiently use the bandwidth of network 904 and the limited processing capabilities of media player devices 906 to exchange and process only the most relevant data for what each user wishes to experience. The patches provided by data delivery system 902 to each media player device 906 may be determined in any suitable manner, such as by relying on predetermined best practices, artificial intelligence, machine learning, or the like.

In some examples, network 904 may include or be implemented by a provider-specific wired or wireless communications network (e.g., a cellular network used for mobile phone and data communications, a 4G or 5G network or network of another suitable technology generation, a cable or satellite carrier network, a mobile telephone network, etc.) that is operated and/or managed by a provider entity such as a mobile network operator (e.g., a wireless service provider, a wireless carrier, a cellular company, etc.). For instance, the provider of such a provider network may own or control all of the elements necessary to sell and deliver communications services to users 908, including radio spectrum allocation, wireless network infrastructure, back haul infrastructure, customer care, provisioning of devices, network repair for network 904, and so forth.

Additionally or alternatively, network 904 may include or be implemented by any interconnected network infrastructure that is external to a provider network and outside of the control of a specific network provider. For example, network 904 may include the Internet, a wide area network, a content delivery network, and/or any other suitable network or networks. In any case, network 904 may be configured to provide data delivery between server-side provider systems (e.g., system 200, data delivery system 902, etc.) and client-side systems and devices (e.g., media player devices 906). To this end, network 904 may implement or employ any suitable communication technologies, devices, media, protocols, or the like as may serve a particular implementation.

Media player devices 906 may each be implemented as (or may be included within) any suitable computing system or device as may be employed for performing any of the use cases or applications described herein. Specifically, for example, media player devices 906 may include one or more display screens (e.g., traditional display screens, partially transparent heads-up display ("HUD") screens, computer monitors, etc.) configured to display rendered graphics representative of an extended reality world presented by media player devices 906. Each media player device 906 may be implemented as a mobile device (e.g., a smartphone, a tablet computing device, etc.), a virtual or augmented reality device (e.g., a head-mounted device configured to display graphics directly in front of each eye of user 208), a portable or stationary computing system (e.g., a personal desktop or laptop computer, etc.), a television device, or any other system or device as may serve a particular implementation.

Each user 908 may represent any person viewing graphics presented by a respective media player device 906 and will be understood to have some degree of control over what graphics his or her media player device 906 presents. For example, a user 908 may indicate a particular viewpoint within an extended reality world corresponding to capture area 304 from which the user 908 wishes to view the world by moving an avatar around within the extended reality world, turning to look in different directions, and so forth. As the user 908 navigates in this manner, his or her media player device 906 may be configured to render the extended reality world from the desired viewpoint based on the extended reality media content (e.g., the rendered patches and so forth) provided by system 200 and data delivery system 902.

Figure 10:
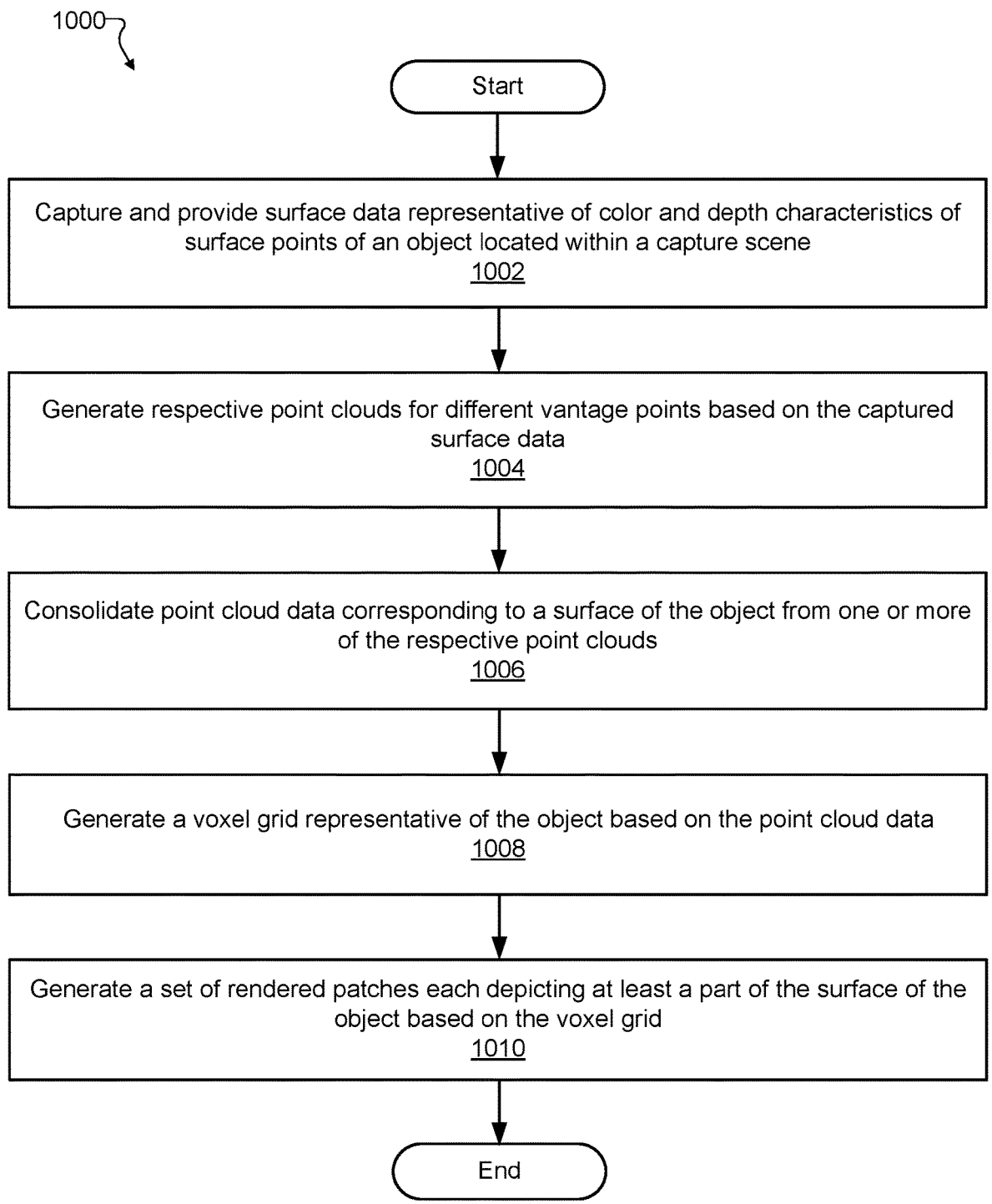
FIG. 10 illustrates an exemplary method for processing volumetric data using a modular network architecture according to embodiments described herein.

FIG. 10 illustrates an exemplary method 1000 for processing volumetric data using a modular network architecture. While FIG. 10 illustrates exemplary operations according to one embodiment, other embodiments may omit, add to, reorder, and/or modify any of the operations shown in FIG. 10. One or more of the operations shown in FIG. 10 may be performed by system 100, any components included therein, and/or any implementation thereof (e.g., system 200 or another volumetric processing system implementation described herein or as may serve a particular implementation).

In operation 1002, a set of image capture systems included in the volumetric processing system and disposed at different vantage points captures and provides surface data. For example, the surface data may be representative of color and depth characteristics of surface points of an object located within a capture area. Operation 1002 may be performed in any of the ways described herein.

In operation 1004, a set of point cloud generators included within the volumetric processing system generates respective point clouds for each of the different vantage points based on the surface data captured in operation 1002. For example, the set of point cloud generators may each correspond to an image capture system in the set of image capture systems, and may generate a respective point cloud for the vantage point of the corresponding image capture system. Operation 1004 may be performed in any of the ways described herein.

In operation 1006, a point cloud organizer included within the volumetric processing system may consolidate point cloud data from one or more of the respective point clouds generated by the set of point cloud generators in operation 1004. For example, the point cloud data consolidated in operation 1006 may correspond to a surface of the object. Operation 1006 may be performed in any of the ways described herein.

In operation 1008, a voxelizer included in the volumetric processing system may generate a voxel grid representative of the object. For instance, the voxelizer may generate the voxel grid based on the point cloud data consolidated for the object in operation 1006. Operation 1008 may be performed in any of the ways described herein.

In operation 1010, a set of patch renderers included in the volumetric processing system and associated with the voxelizer may generate a set of rendered patches each depicting at least a part of the surface of the object. For example, the set of patch renderers may generate the set of rendered patches based on the voxel grid generated in operation 1008. Operation 1010 may be performed in any of the ways described herein.

In certain embodiments, one or more of the systems, components, and/or processes described herein may be implemented and/or performed by one or more appropriately configured computing systems or devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing system or device or may be implemented on more than one physical computing system or device. Accordingly, system components may include any number of computing systems and devices, and may employ any of a number of computer operating systems.

In certain embodiments, one or more of the processes described herein may be implemented at least in part as instructions embodied in a non-transitory computer-readable medium and executable by one or more computing systems. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 11:
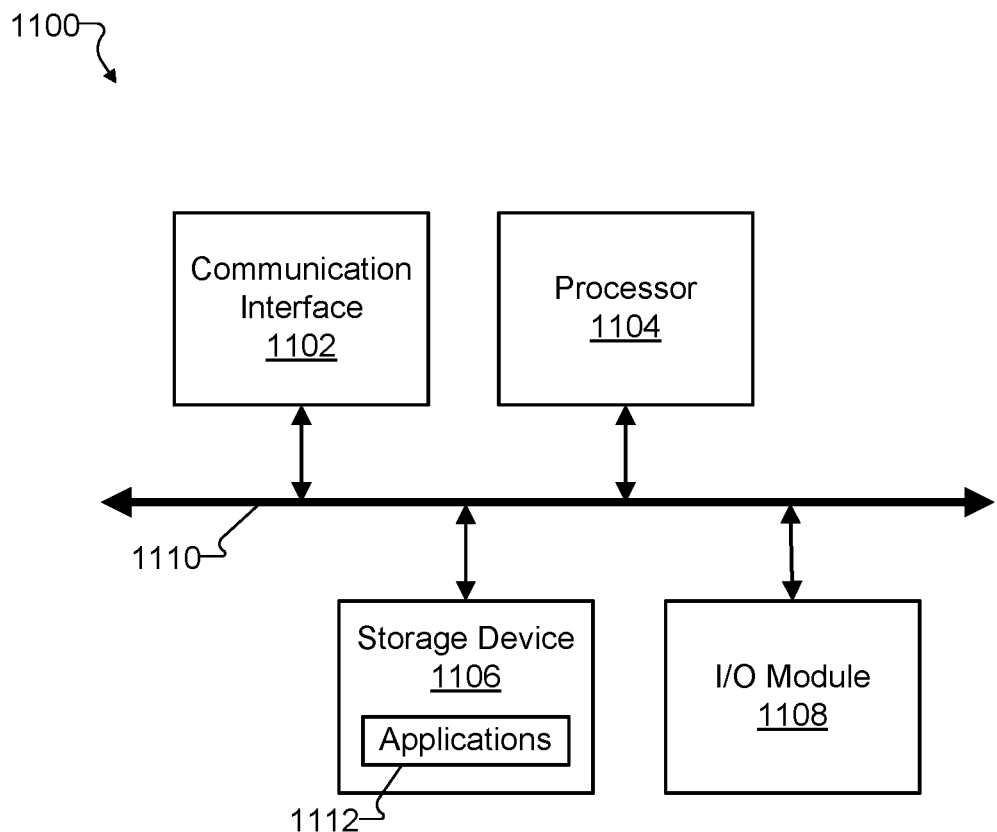
FIG. 11 illustrates an exemplary computing system according to embodiments described herein.

FIG. 11 illustrates an exemplary computing system 1100 that may be specifically configured to perform one or more of the processes described herein. For example, computing system 1100 may implement a volumetric processing system such as system 100, an implementation thereof such as system 200, one or more of the systems included therein (e.g., one or more of point cloud generators 102, point cloud organizers 104, voxelizers 106, patch renderers 108, etc.), or any other computing systems or devices described herein.

As shown in FIG. 11, computing system 1100 may represent any computing system or device that includes components such as a communication interface 1102, a processor 1104, a storage device 1106, and an input/output ("I/O") module 1108 communicatively connected via a communication infrastructure 1110. While an exemplary computing system 1100 is shown in FIG. 11, the components illustrated in FIG. 11 are not intended to be limiting. Additional or alternative components may be used in other embodiments. Components of computing system 1100 shown in FIG. 11 will now be described in additional detail.

Communication interface 1102 may be configured to communicate with one or more computing systems and/or devices. Examples of communication interface 1102 include, without limitation, a wired network interface (such as a network interface card), a wireless network interface (such as a wireless network interface card), a modem, an audio/video connection, and any other suitable interface.

Processor 1104 generally represents any type or form of processing unit capable of processing data or interpreting, executing, and/or directing execution of one or more of the instructions, processes, and/or operations described herein. Processor 1104 may direct execution of operations in accordance with one or more applications 1112 or other computer-executable instructions such as may be stored in storage device 1106 or another computer-readable medium.

Storage device 1106 may include one or more data storage media, devices, or configurations and may employ any type, form, and combination of data storage media and/or device. For example, storage device 1106 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1106. For example, data representative of one or more executable applications 1112 configured to direct processor 1104 to perform any of the operations described herein may be stored within storage device 1106. In some examples, data may be arranged in one or more databases residing within storage device 1106.

I/O module 1108 may include one or more I/O modules configured to receive user input and provide user output. One or more I/O modules may be used to receive input for a single virtual experience. I/O module 1108 may include any hardware, firmware, software, or combination thereof supportive of input and output capabilities. For example, I/O module 1108 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing system 1100. For example, one or more applications 1112 residing within storage device 1106 may be configured to direct processor 1104 to perform one or more processes or functions associated with one of point cloud generators 102, point cloud organizer 104, voxelizer 106, one of patch renderers 108, or the like.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A volumetric processing system comprising:
    a set of point cloud generators each corresponding to an image capture system in a set of image capture systems disposed at different vantage points and configured to capture and provide surface data representative of color and depth characteristics of surface points of an object located within a capture area, the set of point cloud generators configured to generate respective point clouds for each of the different vantage points based on the captured surface data;
    a point cloud organizer configured to consolidate point cloud data, from one or more of the respective point clouds generated by the set of point cloud generators, that corresponds to a surface of the object;
    a voxelizer configured to generate, based on the consolidated point cloud data for the object, a voxel grid representative of the object; and
    a set of patch renderers associated with the voxelizer and configured to generate, based on the voxel grid, a set of rendered patches each depicting at least a part of the surface of the object.

2. The volumetric processing system of claim 1, wherein the point cloud organizer is further configured to:
    determine a performance capability of at least one of the voxelizer and the set of point cloud generators; and
    identify the object for which the point cloud organizer consolidates the point cloud data by defining the object based on the performance capability.

3. The volumetric processing system of claim 2, wherein the object identified by the point cloud organizer is a process object that is incorporated, together with at least one other process object, in a natural object located within the capture area.

4. The volumetric processing system of claim 2, wherein the point cloud organizer is further configured to
    dynamically detect a change, during operation of the volumetric processing system, to at least one of
        the performance capability of the at least one of the voxelizer and the set of point cloud generators, and
        the identified object for which the point cloud organizer consolidates the point cloud data; and
    dynamically redefine, during the operation of the volumetric processing system, the object based on the detected change.

5. The volumetric processing system of claim 1, wherein:
    the point cloud data corresponding to the surface of the object and consolidated by the point cloud organizer is consolidated from a plurality of respective point clouds generated by the set of point cloud generators; and
    the respective point clouds each represent different parts of the surface of the object such that a first part of the surface represented by a first point cloud of the respective point clouds is represented only by the first point cloud and not by a second point cloud of the respective point clouds.

6. The volumetric processing system of claim 1, wherein:
    a same dataset of the voxel grid representative of the object is provided by the voxelizer to all the patch renderers in the set of patch renderers; and
    each patch renderer in the set of patch renderers is assigned to generate, based on the same dataset provided by the voxelizer, a different respective rendered patch depicting a different assigned part of the surface of the object.

7. The volumetric processing system of claim 6, wherein the different assigned parts of the surface of the object that are depicted by the different respective rendered patches generated by the set of patch renderers collectively comprise an entirety of the surface of the object.

8. The volumetric processing system of claim 1, further comprising a data delivery system communicatively coupled to the set of patch renderers and configured to:
    receive the set of rendered patches generated by the set of patch renderers;
    arrange a plurality of rendered patches from the received set of rendered patches on an atlas image; and
    provide, by way of a network, the atlas image to a media player device configured to render for a user a virtual representation of the capture area based on the rendered patches arranged on the atlas image.

9. The volumetric processing system of claim 1, further comprising a point cloud relational system communicatively coupled to the set of point cloud generators and to a set of point cloud organizers that includes the point cloud organizer, the point cloud relational system configured to:
    track point cloud relationships between point cloud data and objects located within the capture area so as to dynamically determine which point cloud data generated by the set of point cloud generators is to be used by which point cloud organizers in the set of point cloud organizers; and
    store and provide access to point cloud relational data indicative of the tracked point cloud relationships between the point cloud data and the objects located within the capture area.

10. The volumetric processing system of claim 1, wherein each respective point cloud includes a plurality of datapoints that each represent
    a color characteristic of a particular surface point; and
    a depth characteristic of the particular surface point, the depth characteristic defining a three-dimensional position of the particular surface point with respect to a world coordinate system common to all the datapoints included in all the respective point clouds generated by the set of point cloud generators.

11. A method comprising:
    capturing and providing, by a set of image capture systems disposed at different vantage points, surface data representative of color and depth characteristics of surface points of an object located within a capture area;

generating, by a set of point cloud generators each corresponding to an image capture system in the set of image capture systems, respective point clouds for each of the different vantage points based on the captured surface data;

consolidating, by a point cloud organizer, point cloud data from one or more of the respective point clouds generated by the set of point cloud generators, the point cloud data corresponding to a surface of the object;

generating, by a voxelizer based on the consolidated point cloud data for the object, a voxel grid representative of the object; and generating, based on the voxel grid by a set of patch renderers associated with the voxelizer, a set of rendered patches each depicting at least a part of the surface of the object.

12. The method of claim 11, further comprising:

determining, by the point cloud organizer, a performance capability of at least one of the voxelizer and the set of point cloud generators; and identifying, by the point cloud organizer, the object for which the point cloud organizer consolidates the point cloud data by defining the object based on the performance capability.

13. The method of claim 12, wherein the object identified by the point cloud organizer is a process object that is incorporated, together with at least one other process object, in a natural object located within the capture area.

14. The method of claim 12, wherein:

the set of image capture systems, the set of point cloud generators, the point cloud organizer, the voxelizer, and the set of patch renderers are all included within a volumetric processing system configured to operate to perform the method; and the method further includes dynamically detecting a change, by the point cloud organizer during operation of the volumetric processing system, to at least one of the performance capability of the at least one of the voxelizer and the set of point cloud generators, and the identified object for which the point cloud organizer consolidates the point cloud data, and dynamically redefining, by the point cloud organizer during the operation of the volumetric processing system, the object based on the detected change.

15. The method of claim 11, wherein:

the point cloud data corresponding to the surface of the object and consolidated by the point cloud organizer is consolidated from a plurality of respective point clouds generated by the set of point cloud generators; and the respective point clouds each represent different parts of the surface of the object such that a first part of the surface represented by a first point cloud of the respective point clouds is represented only by the first point cloud and not by a second point cloud of the respective point clouds.

16. The method of claim 11, wherein:

a same dataset of the voxel grid representative of the object is provided by the voxelizer to all the patch renderers in the set of patch renderers; and each patch renderer in the set of patch renderers generates, based on the same dataset provided by the voxelizer, a different respective rendered patch depicting a different assigned part of the surface of the object.

17. The method of claim 16, wherein the different assigned parts of the surface of the object that are depicted by the different respective rendered patches generated by the set of patch renderers collectively comprise an entirety of the surface of the object.

18. The method of claim 11, further comprising:

receiving, by a data delivery system communicatively coupled to the set of patch renderers, the set of rendered patches generated by the set of patch renderers;

arranging, by the data delivery system, a plurality of rendered patches from the received set of rendered patches on an atlas image; and providing, by the data delivery system by way of a network, the atlas image to a media player device associated with a user and configured to render for the user a virtual representation of the capture area based on the rendered patches arranged on the atlas image.

19. The method of claim 11, embodied as computer-executable instructions on at least one non-transitory computer-readable medium.

* * * * *